(12) United States Patent
Steen et al.

(10) Patent No.: US 7,214,166 B2
(45) Date of Patent: May 8, 2007

(54) METHOD AND ARRANGEMENT FOR DISTRIBUTING BRAKE TORQUE ON A VEHICLE

(75) Inventors: Marcus Steen, Angered (SE); Erik Lauri, Molndal (SE); Svante Karlsson, Vastra Frolunda (SE); Helene Panagopoulos, Gothenburg (SE)

(73) Assignee: Volvo Lastvagnar AB, Ekilstuna (SE)

( * ) Notice: Subject to any disclaimer, the term of this patent is extended or adjusted under 35 U.S.C. 154(b) by 0 days.

(21) Appl. No.: 11/530,462

(22) Filed: Sep. 9, 2006

(65) Prior Publication Data
US 2007/0004557 A1    Jan. 4, 2007

Related U.S. Application Data

(63) Continuation of application No. PCT/SE2005/000300, filed on Mar. 2, 2005.

(51) Int. Cl.
*B60W 10/18* (2006.01)
(52) U.S. Cl. .......... 477/185; 477/186; 477/187
(58) Field of Classification Search ......... 477/183–187
See application file for complete search history.

(56) References Cited

U.S. PATENT DOCUMENTS

| | | | | |
|---|---|---|---|---|
| 4,804,074 | A | * | 2/1989 | Kori ............................ 477/74 |
| 5,303,986 | A | | 4/1994 | Van De Motter et al. |
| 5,460,580 | A | * | 10/1995 | Streib ......................... 477/110 |
| 6,062,658 | A | | 5/2000 | Stumpe et al. |
| 6,350,217 | B1 | * | 2/2002 | Unterforsthuber .......... 477/174 |

FOREIGN PATENT DOCUMENTS

| | | |
|---|---|---|
| DE | 19843580 A1 | 3/2000 |
| WO | 0149542 A1 | 7/2001 |

* cited by examiner

*Primary Examiner*—Ha Ho
(74) *Attorney, Agent, or Firm*—Novak Druce + Quigg, LLP

(57) ABSTRACT

Method and apparatus for distributing brake torque between at least one first and one second brake device on a motor vehicle including at least two wheel pairs. The first brake device is a friction brake which acts on at least one wheel pair and the second brake device acts on at least the driven wheel pair via the transmission and is disposed before the clutch device of the transmission. Brake torque is distributed between the first and the second brake device in a manner that compensates for the loss of brake torque which occurs when the second brake device is disengaged by the clutch device of the transmission.

13 Claims, 1 Drawing Sheet

METHOD AND ARRANGEMENT FOR DISTRIBUTING BRAKE TORQUE ON A VEHICLE

CROSS-REFERENCE TO RELATED APPLICATIONS

The present application is a continuation patent application of International Application No. PCT/SE2005/0003000 filed 2 Mar. 2005 which is published in English pursuant to Article 21(2) of the Patent Cooperation Treaty and which claims priority to Swedish Application No. 0400603-7 filed 9 Mar. 2004. Said applications are expressly incorporated herein by reference in their entireties.

FIELD OF THE INVENTION

The present invention relates to a method and a device for distributing the brake torque between service brakes and auxiliary brakes of a vehicle when the vehicle is driven at a low speed and in a low gear.

BACKGROUND

It is known to arrange auxiliary brakes in a vehicle as a complement to the service brakes of the vehicle. Auxiliary brakes are primarily used in heavy-duty vehicles with the principal aim of saving the service brakes of the vehicle, especially when driving on long downhill slopes where there is a desire to brake to maintain fairly constant speed. The use of the auxiliary brakes allows the service brakes to be kept fresh, so that they can provide maximum braking force when the vehicle really does need to slow down quickly. The service brakes have a much more powerful braking action than the auxiliary brakes, partially owing to the fact that the service brakes are normally arranged on all the wheels of the vehicle. The auxiliary brakes normally act only on the driving wheels.

It is further known to differentiate between so-called primary and secondary auxiliary brakes in a vehicle. Primary and secondary alludes to the positioning of the auxiliary brake before or after the main gearbox of the vehicle. Examples of primary auxiliary brakes are ISG (Integrated Starter & Generator) and retarders. A retarder is usually of the hydrodynamic retarder or the electromagnetic retarder type. These are disposed between the engine and the main gearbox. A primary auxiliary brake can also be constituted by various types of engine brakes, for example compression brake, exhaust brake or the internal friction of the engine. The braking energy in a compression brake and exhaust brake is converted mainly into heat, which, in large part, is dissipated via the engine cooling system, though it should be noted that a substantial part (about 40% of the braking energy) accompanies the vehicle exhaust gases out through the exhaust system. The brake power which can be delivered by a primary auxiliary brake is dependent on the engine speed, and for this reason it is advantageous to maintain a relatively high engine speed whenever a primary auxiliary brake is used.

The internal friction of the engine can be adjusted by injecting a certain quantity of fuel into the engine, for example, so that the output torque from the engine becomes zero when no brake power is wanted. Another option for avoiding internal friction of the engine is to disengage the engine from the rest of the drive line by means of a clutch disposed between the engine and the gearbox. In the present context, drive line is meant to include the vehicle engine, as well as transmission components coupled to the engine, and continuing up to the drive wheels. Other controllable units which are coupled to the engine also contribute to the braking force from the engine; i.e., are added to the brake torque from the internal friction of the engine. Examples of such units are the cooling fan of the engine, the air conditioning unit of the vehicle, air compressors, generators and other accessory units coupled to the engine.

In the present disclosure, the term "friction torque of the engine" is used to denote brake torque that is obtained from the internal friction of the engine with connected units, but without any other auxiliary brakes being connected. The term "engine brakes" embraces compression brake, exhaust brake and the friction torque of the engine.

A secondary auxiliary brake, which is disposed somewhere after the main gearbox of the vehicle, is usually constituted by a retarder of the hydrodynamic or electromagnetic type. The brake power which can be delivered by a secondary auxiliary brake is dependent on the speed of the vehicle since the auxiliary brake is mounted on the output shaft of the gearbox and is therefore proportional to the rotation speed of the drive wheels.

When a vehicle is driven on a downhill slope, the brake power of the auxiliary brake may not prove sufficient, but rather the driver may instead need to support this with the service brake in order to maintain a low and regular vehicle speed. On certain occasions, the brake power from an auxiliary brake can be cut-off without the driver expecting it, which can be disquieting for the driver.

Such a situation occurs when the vehicle is being driven on a steep downhill slope at a low speed and the vehicle is equipped with a semiautomatic gearbox; i.e., an automatically shifted stage-geared gearbox. These gearboxes are often non-synchronized and the vehicle has no manual clutch pedal for disconnecting the clutch in the transmission. When the driver brakes the vehicle to reduce the speed, the engine speed will also decrease. When the engine speed approaches the idling speed of the engine, the system will disengage the gearbox; i.e., the power transmission between the engine and the transmission is broken. This disengagement is realized to prevent the vehicle from driving the vehicle forward with the aid of the idle regulator and prevent the engine from being throttled down. This means, at the same time, that the brake torque deriving from the internal friction of the engine, and any primary auxiliary brakes, disappears. The result is a sudden reduction in braking torque which can cause the vehicle to start to accelerate. This can be disquieting for the driver because he senses a reduced brake power even though he is stepping on the service brake.

There is therefore a need to be able to distribute the brake torque between service brakes and engine brakes in a vehicle in a way which compensates for the loss of brake power from the engine brakes. This is the main aim of the invention which is described below.

SUMMARY

One object of the invention is therefore to provide a method and a device for distributing the brake torque between service brakes and engine brakes in a vehicle when the brake torque from the engine brake disappears.

With a method for distributing brake torque between at least one first and one second brake device on a motor vehicle comprising at least two wheel pairs, an internal combustion engine and a transmission, in which the first brake device is a friction brake which acts on at least one wheel pair and in which the second brake device acts on at least one driven wheel pair via the transmission and is disposed before the clutch device of the transmission, the object is achieved by the brake torque distribution between the first and the second brake device compensating for the loss of brake torque which occurs when the second brake device is cut off with the clutch device of the transmission.

The device according to the invention achieves the objective by distributing the brake torque between service brakes and auxiliary brakes of a motor vehicle so that it compensates for the loss of brake torque which occurs when the second brake device is cut off with the clutch device of the transmission.

By the method according to the invention, the brake torque is automatically redistributed from an engine brake to the service brakes when the transmission cuts off the engine brake. The advantage with this method is that the total brake performance of the vehicle remains constant, even when the engine brake is cut off.

In a first embodiment of the method according to the invention, the method is performed when the speed of the vehicle is low, for example when it falls below 20 km/h. The purpose of this is to secure an adequate safety level when the method is performed. In a second embodiment of the method according to the invention, the method is performed when a high gear ratio is used, for example when the total gear ratio of the gearbox exceeds, for example, 6 times. The purpose of this is to secure an adequate safety level when the method is performed.

In a third embodiment of the method according to the invention, the method is performed when the engine speed falls below a predetermined speed, for example 800 rpm. The purpose of this is to secure an adequate safety level when the method is executed.

In a fourth embodiment of the method according to the invention, the method selects particular gears on the vehicle. The advantage with this is to optimize the brake power of the auxiliary brakes. The purpose of this is to secure an adequate safety level when the method is executed.

In a fifth embodiment of the method according to the invention, the friction brakes of a trailer are also used to compensate for the loss of brake torque which occurs when the second brake device is cut off with the clutch device of the transmission. The advantage is an increase in available brake torque.

In a sixth embodiment of the method according to the invention, the method predicts the brake torque requirement through the use of, for example, an electronic map and/or GPS. The purpose of this is to increase the safety level when the method is executed.

Through the device according to the invention, the device compensates for the loss of brake torque which occurs when the second brake device is cut off with the clutch device of the transmission. The advantage with this device is that the brake torque of the vehicle is kept constant, even when the brake torque of the engine disappears.

BRIEF DESCRIPTION OF THE DRAWINGS

The invention will be described in greater detail below with reference to illustrative embodiments shown in the accompanying drawings, wherein.

DETAILED DESCRIPTION

Figure 1:
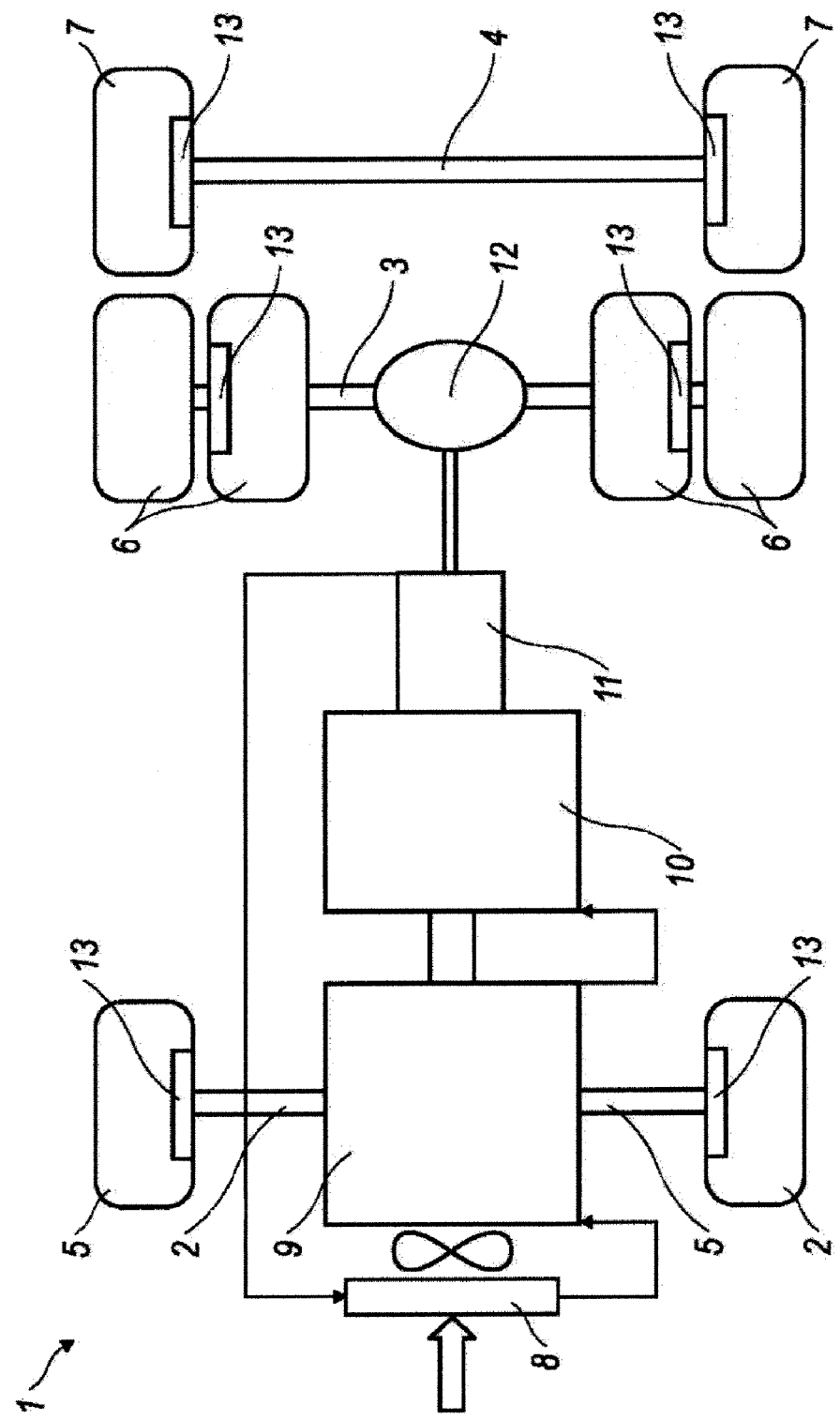
FIG. 1 schematically shows a vehicle having brake devices configured according to the teachings of the disclosed invention(s).

The following described illustrative embodiments of the invention, with further developments and variations, should be regarded purely as examples and should in no way be considered to limit the protective scope of the patent claims. In the illustrative embodiments which are described here, disk brakes are used as examples of service brakes. The illustrative embodiments also apply to drum brakes. Furthermore, the term "wheel axle" is used not only for a physical through shaft, but also applies to wheels positioned on a geometric axis, even if the wheels are individually suspended.

FIG. 1 shows a diagrammatic representation of a vehicle 1 having a front wheel axle 2, a first rear wheel axle 3 and a second rear wheel axle 4. Mounted on the front wheel axle 2 is a front wheel pair 5, which steers the vehicle. A first rear wheel pair 6 is mounted on the first rear wheel axle 3, which is also the drive axle of the vehicle. The first rear wheel pair 6, as shown, consists of a so-called twin assembly; i.e., two wheels on each side of the drive axle. The second rear wheel pair 7 is mounted on the second rear wheel axle 4, which is a lifting axle which is used with heavy load. Each wheel consists of a tire fitted on a rim.

Each side of a wheel axle is equipped with a service brake 13, here in the form of pneumatically operated disk brakes. The service brakes are electronically controlled with the aid of an electronic control unit (ECU), comprising, inter alia, a computer (not shown). The service brakes can be individually controlled, for example to allow active stabilization control (ESP=Electronic Stability Program). The vehicle further comprises a radiator 8, an engine 9, a gearbox 10, a hydraulic auxiliary brake in the form of a retarder (CR=Compact Retarder) 11 and an end gear 1 2. The engine comprises auxiliary brakes in the form of a compression brake (VCB=Volvo Compression Brake), an exhaust brake and the friction brake torque of the engine. These components are well known to persons skilled in these arts and are not described in any further detail for that reason.

Normally, a driver tries to make as much use as possible of the auxiliary brakes, especially during lengthy downhill gradients. A common driving strategy is to use the auxiliary brakes to maintain a regular vehicle speed and only to use the service brakes to reach this speed.

In a driving situation, the vehicle is driven on a downhill slope at a low speed. The driver reduces the speed still further by braking with the service brake, for example when the vehicle approaches a bend or is set to stop. When the speed is reduced without downward gearshift, then the engine speed will simultaneously decrease. When the engine speed decreases, the brake torque delivered from the compression brake and the exhaust brake decreases. When the engine speed begins to approach the idling speed of the engine, the greatest part of the engine brake comes from the internal friction of the engine. If the driver brakes still more, the engine speed will become equal to the idling speed. When this occurs, the idle regulator will adjust the engine speed to the idling speed, the effect of which is that the vehicle will continue to be driven forward unless the driver disengages. If the driver steps heavily on the brake, it is possible for the engine to be fully throttled down and to stop; i.e. kill the engine.

Since the vehicle is being driven at low speed and low engine speed, this means that a low gear is engaged. A low gear has a high gear ratio, which means that even if the friction torque of the engine is relatively low, this will be multiplied with the gear ratio of the gearbox. The internal friction in the engine can amount, for example, to about 5% of the torque which can be delivered by the engine. For low gears, a gearbox has a transmission ratio in the region of around 10 times. The effect of this is that the total braking torque from the internal friction of the engine, for example, can range from 500 to 2000 Nm in a low gear.

When a vehicle is equipped with a semiautomatic gearbox; i.e., an automatically shifted stage-geared gearbox, then the control program of the gearbox will prevent the engine speed from falling as low as the idling speed. These gearboxes are often non-synchronized and the vehicle has no manual clutch pedal for disconnecting the clutch in the transmission. The control program is therefore configured so that the gearbox disengages at an engine speed which is somewhat higher than the idling speed. For example, the idling engine speed for a truck may be 600 rpm and the disengagement engine speed may be 650 rpm.

The effect of this is that when a driver drives a vehicle at low speed and brakes in order to reduce the speed still further, the vehicle, instead of reducing the speed, can proceed to increase the speed since the gearbox disengages the engine at the predefined disengagement engine speed so that the whole of the brake power from the engine brake suddenly disappears.

With the method according to the invention for distributing brake torque between a first and a second brake device, this problem is solved.

When a driver drives a vehicle at low speed and brakes in order to reduce the speed still further, then a control unit detects the engine speed. When the engine speed begins to approach the disengagement engine speed, then the system switches to a standby mode. In the standby mode, the control unit calculates the brake torque delivered by the internal friction of the engine. If the engine speed reaches the disengagement speed, then the clutch is disengaged. At the same time, the system sends a message to the control unit of the service brakes with a request for the brake torque of the service brakes to be increased by the instantaneous brake torque of the engine brake; i.e., the brake torque exhibited by the engine brake when the request is sent.

The brake torque which is generated by the internal friction of the engine can be calculated in a variety of ways. For example, a predetermined function of engine speed and oil temperature can be used. Load from auxiliary units driven by the engine can also be taken into account. The friction torque can also be measured with the aid of a torque transducer, for example placed on the input shaft of the gearbox.

Once the control unit controlling the service brakes has received a request to increase the brake torque of the service brakes, the control unit executes the request. Advantageously, this execution; i.e., the increasing of brake torque of the service brakes, is realized with a time constant corresponding to the disengagement of the gearbox. The effect of this is that the brake torque of the service brakes increases commensurate with the decrease in brake torque of the engine brake so that the total brake torque of the vehicle remains constant. The result is that the driver does not perceive a change in the total brake torque, but rather the vehicle behaves as the driver expects. The total brake torque exerted by the service brakes now consists of the brake torque requested by the driver via the brake pedal, added to the brake torque corresponding to the brake torque of the engine brake.

If the driver releases the brake, then the brake torque requested by the driver via the brake pedal decreases. The brake torque corresponding to the brake torque of the engine brake will persist, even when the brake pedal is fully released. The request to increase the brake torque of the service brake only ceases once the clutch is reengaged.

Since the engine is disengaged, the engine speed will not increase if the vehicle speed increases. Instead, the rotation speed at the output shaft of the freewheel clutch is measured; i.e., that side of the freewheel clutch which is connected to the transmission. Once this rotation speed reaches a speed which is somewhat higher than the disengagement speed, for example 750 rpm, the clutch is reengaged and hence the brake torque of the engine is reconnected. This rotation speed is referred to as the engagement engine speed. The engagement engine speed is higher than the disengagement engine speed in order to avoid self-oscillations in the system.

In an embodiment of the method according to the invention, the service brakes in a trailer coupled to the towing vehicle can also be used to compensate for the loss of brake torque from the engine brake when the transmission is disengaged. This is advantageous, inter alia, for securing an increase in the total available brake torque, which means that there is less load placed upon the service brakes of the vehicle. Requested brake torque can be transmitted to the trailer in a variety of ways. Either the trailer can be equipped with an intelligent control unit for the brakes, which communicates with the control system of the towing vehicle. Or, alternatively, the trailer is braked with a certain intensity and the control unit of the towing vehicle constantly calculates the brake torque which this yields in order to be able to accurately control the brake torque.

In these illustrative embodiments, a calculation model is used to optimize the brake torque distribution. This calculation model has, inter alia, the instantaneous road gradient as an input parameter.

In a first illustrative embodiment of the device according to the invention, the device comprises an electronic control unit (not shown), which transmits control signals to the brake devices. The control unit detects the engine speed and calculates the brake torque delivered by the engine brake; i.e., the internal friction of the engine, when the vehicle is driven at low speed. When the engine speed reaches the disengagement engine speed, the clutch is disengaged. At the same time, the control unit sends a message to the control unit of the service brakes with a request for the brake torque of the service brakes to be increased by the instantaneous brake torque of the engine brake; i.e., the brake torque exhibited by the engine brake when the gearbox is disengaged.

Once the control unit controlling the service brakes has received a request to increase the brake torque of the service brakes, the control unit executes the request. Advantageously, this execution; i.e., the increasing of brake torque of the service brakes, is performed with a time constant corresponding to the disengagement of the gearbox. The effect of this is that the brake torque of the service brakes increases commensurate with the decrease in brake torque of the engine brake, so that the total brake torque of the vehicle remains constant. The result is that the driver does not perceive a change in the total brake torque, but rather the vehicle behaves as the driver expects. The total brake torque exerted by the service brakes now consists of the brake torque requested by the driver via the brake pedal, added to the brake torque corresponding to the brake torque of the engine brake.

Once the clutch is reengaged; i.e., once the transmission is reengaged and the internal friction of the engine is hence able to brake the vehicle, a message is sent to the control unit of the service brakes with a request to remove the brake torque which was previously added to the brake torque of the service brakes.

The brake torque which is generated by the internal friction of the engine can be calculated in a variety of ways. For example, a predetermined function of engine speed and oil temperature can be used. Load from auxiliary units driven by the engine can also be taken into account. The friction torque can also be measured with the aid of a torque transducer, for example placed on the input shaft of the gearbox.

For this brake torque calculation, the control unit can use various input signals from the vehicle. Depending on the algorithm, one or more of the following input parameters can also be used. These can be one or more of the following: vehicle speed, vehicle acceleration, instantaneous brake torque, vehicle weight, carriageway gradient, coolant temperature, outside temperature, vehicle position. In the case of a vehicle combination consisting of a towing vehicle and a trailer, those parameters which are specific to the trailer can also be used in the calculation algorithm.

The invention should not be deemed to be limited to the illustrative embodiments described above, but rather a number of further variants and modifications are conceivable within the scope of the patent claims. For example, it is possible also to distribute the brake torque between a tow vehicle and a trailer by taking into account the temperature of the brake devices of the trailer. This can be advantageous, for example, when the towing vehicle and the trailer have different brake linings.

What is claimed is:

1. A method for distributing brake torque between at least one of first and one second brake devices on a motor vehicle comprising at least two wheel pairs, a vehicle engine and a transmission, and wherein the first brake device is a friction brake that acts on at least one wheel pair and wherein the second brake device acts on at least one driven wheel pair via the transmission and is disposed before a clutch device of the transmission, said method comprising:
   compensating for loss of brake torque which occurs when the second brake device is disengaged with the clutch device of the transmission by distributing brake torque between the first and the second brake devices.

2. The method as recited in claim 1, further comprising:
   disengaging the second brake device at a predefined engine speed using the clutch device of the transmission.

3. The method as recited in claim 1, wherein the second brake device is an engine brake.

4. The method as recited in claim 1, wherein the second brake device is driven by internal friction of the engine.

5. The method as recited in claim 1, further comprising:
   performing said compensation when the speed of the vehicle falls below 20 km/h.

6. The method as recited in claim 1, further comprising:
   performing said compensation when the total gear ratio of the gearbox exceeds six times.

7. The method as recited in claim 1, further comprising:
   performing said compensation when the engine speed falls below 800 rpm.

8. The method as recited in claim 1, further comprising:
   utilizing friction brakes of a connected trailer to compensate for the loss of brake torque which occurs when the second brake device is disengaged with the clutch device of the transmission.

9. The method as recited in claim 1, further comprising:
   utilizing at least one of the following vehicle characteristics as input parameters to an electronic controller that affects said compensation, said vehicle characteristics comprising: vehicle speed, engine speed, oil temperature, vehicle acceleration, instantaneous brake torque, vehicle weight, carriageway gradient, coolant temperature, outside temperature, load from auxiliary units driven by the engine, gearbox torque, and vehicle position.

10. The method as recited in claim 1, further comprising:
    paying regard to stored information regarding the stretch of road lying ahead of the vehicle.

11. A system for distributing brake torque between at least one of a first and a second brake device on a motor vehicle comprising at least two wheel pairs, said system comprising:
    said first brake device being a friction brake that acts on at least one wheel pair of the motor vehicle;
    said second brake device acts on at least one driven wheel pair of the motor vehicle via a transmission of the vehicle and which is disposed before a clutch device of the transmission, and wherein said system distributes brake torque between the first and the second brake devices and thereby compensates for the loss of brake torque which occurs when the second brake device is disengaged with the clutch device of the transmission.

12. A computer program comprising program code that when executed by a computer performs the following: (1) distributes brake torque between at least one of first and one second brake devices on a motor vehicle comprising at least two wheel pairs, a vehicle engine and a transmission, and wherein the first brake device is a friction brake that acts on at least one wheel pair and wherein the second brake device acts on at least one driven wheel pair via the transmission and is disposed before a clutch device of the transmission and (2) compensates for loss of brake torque which occurs when the second brake device is disengaged with the clutch device of the transmission by distributing brake torque between the first and the second brake devices.

13. A computer program product comprising a program code stored on a computer-readable medium that when executed by a computer performs the following: (1) distributes brake torque between at least one of first and one second brake devices on a motor vehicle comprising at least two wheel pairs, a vehicle engine and a transmission, and wherein the first brake device is a friction brake that acts on at least one wheel pair and wherein the second brake device acts on at least one driven wheel pair via the transmission and is disposed before a clutch device of the transmission and (2) compensates for loss of brake torque which occurs when the second brake device is disengaged with the clutch device of the transmission by distributing brake torque between the first and the second brake devices.

* * * * *